US006940693B2

United States Patent
Lille et al.

(10) Patent No.: US 6,940,693 B2
(45) Date of Patent: Sep. 6, 2005

(54) MAGNETIC HEAD HAVING MEDIA HEATING DEVICE THAT IS ELECTRICALLY CONNECTED TO MAGNETIC POLE PIECE

(75) Inventors: Jeffrey S. Lille, Sunnyvale, CA (US); Hugo Alberto Emilio Santini, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 154 days.

(21) Appl. No.: 10/675,065

(22) Filed: Sep. 29, 2003

(65) Prior Publication Data

US 2005/0068676 A1 Mar. 31, 2005

(51) Int. Cl.[7] ............................................. G11B 5/147
(52) U.S. Cl. ...................................................... 360/126
(58) Field of Search ................................ 360/125–126

(56) References Cited

U.S. PATENT DOCUMENTS

| | | | |
|---|---|---|---|
| 5,341,262 A | 8/1994 | Yamasaki et al. | 360/128 |
| 5,436,776 A | 7/1995 | Kurokawa | 360/103 |
| 5,974,657 A | 11/1999 | Fox et al. | 29/603.08 |
| 6,069,853 A | 5/2000 | Novotny et al. | 369/13 |
| 6,317,280 B1 | 11/2001 | Nakajima et al. | 360/59 |
| 2002/0191320 A1 | 12/2002 | Coffey et al. | 360/59 |
| 2004/0240109 A1 * | 12/2004 | Hamann et al. | 360/126 |

FOREIGN PATENT DOCUMENTS

| | | |
|---|---|---|
| JP | 61105709 A | 5/1986 |
| JP | 1191313 A | 8/1989 |
| JP | 2042611 A | 6/1991 |
| JP | 11096608 A | 11/2001 |
| JP | 2002-074606 | 3/2002 |

* cited by examiner

Primary Examiner—A. J. Heinz
(74) Attorney, Agent, or Firm—Robert O. Guillot; Intellectual Property Law Offices

(57) ABSTRACT

An embodiment of a magnetic head of the present invention includes a media heating device that is fabricated within the magnetic head structure following the fabrication of the read head element of the magnetic head. The media heating device is preferably fabricated between the first and second magnetic pole layers and close to the ABS surface of the head. The heating device includes electrical leads and an electrically resistive heating element that is preferably comprised of TaSiN, NiCr or NiFe, and in the present invention one or both of the magnetic poles are utilized as an electrical lead of the heating device. The heating device serves to heat the magnetic media immediately prior to the passage of the magnetic media beneath the pole tip, which lowers the localized coercivity of the media and facilitates the writing of data to the media by the write head element of the magnetic head.

16 Claims, 4 Drawing Sheets

US 6,940,693 B2

MAGNETIC HEAD HAVING MEDIA HEATING DEVICE THAT IS ELECTRICALLY CONNECTED TO MAGNETIC POLE PIECE

BACKGROUND OF THE INVENTION

1. Field of the Invention

The present invention relates generally to magnetic heads that are utilized with thin film hard disk data storage devices, and more particularly to the design and fabrication of a magnetic head having a storage media heating device formed therein, where a magnetic pole of the magnetic head serves as an electrical lead of the heating device.

2. Description of the Prior Art

Hard disk drives generally include one or more rotatable data storage disks having a magnetic data storage layer formed thereon. Data in the form of small magnetized areas, termed magnetic data bits, is written onto the magnetic layers of the disks by a magnetic head that includes magnetic poles through which magnetic flux is caused to flow. Magnetic flux flowing from a pole tip portion of the magnetic poles in close proximity to the magnetic layer on the disk, causes the formation of the magnetic bits within the magnetic layer.

The continual quest for higher data recording densities of the magnetic media demands smaller magnetic data bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. Present methods to delay the onset of this limit in storage media include the use of higher magnetic moment materials, and using thermally assisted recording heads. The present invention relates to such thermally assisted recording heads in which a heating device is disposed within the magnetic head. Heat from the heating device temporarily reduces the localized coercivity of the magnetic media, such that the magnetic head is able to record data bits within the media. Once the disk returns to ambient temperature, the very high coercivity of the magnetic media provides the bit latency necessary for the recorded data disk.

The fabrication of such heating devices within magnetic heads necessarily involves a plurality of fabrication steps that are required to fabricate a heating element as well as the electrical leads that convey current to the heating element. Each additional fabrication step adds unwanted complexity and expense to the head fabrication process. It is therefore an objective of the present invention to reduce the number of heating device fabrication steps by utilizing existing magnetic head structures, such as the magnetic poles, as one or both of the electrical leads to the heating element.

SUMMARY OF THE INVENTION

An embodiment of a magnetic head of the present invention includes a media heating device that is fabricated within the magnetic head structure following the fabrication of the read head element of the magnetic head. The media heating device is preferably fabricated between the first and second magnetic pole layers and close to the ABS surface of the head. The heating device includes electrical leads and an electrically resistive heating element that is preferably comprised of TaSiN, NiCr or NiFe, and in the present invention one or both of the magnetic poles are utilized as an electrical lead of the heating device. The heating device serves to heat the magnetic media immediately prior to the passage of the magnetic media beneath the pole tip, which lowers the localized coercivity of the media and facilitates the writing of data to the media by the write head element of the magnetic head.

It is an advantage of the magnetic head of the present invention that it includes a media heating device to facilitate the writing of data to a magnetic disk.

It is another advantage of the magnetic head of the present invention that the media heating device includes electrical leads that are comprised of at least one magnetic pole of the magnetic head.

It is a further advantage an of embodiment of the magnetic head of the present invention that the media heating device is fabricated within a perpendicular magnetic head.

It is yet another advantage of an embodiment of the magnetic head of the present invention that the media heating device is fabricated within a longitudinal magnetic head.

It is yet a further advantage of an embodiment of the magnetic head of the present invention that the media heating device is easier and less expensive to fabricate in that one or both of the electrical leads are comprised of a magnetic pole of the magnetic head.

It is an advantage of the hard disk drive of the present invention that it includes a magnetic head having a media heating device, whereby higher data areal storage densities of the hard disk drive can be obtained.

It is another advantage of the hard disk drive of the present invention that it includes a magnetic head having a media heating device, whereby data storage disks a higher coercivity can be written upon.

It is a further advantage of the hard disk drive of the present invention that it includes a magnetic head having a media heating device that includes electrical leads that are comprised of at least one magnetic pole of the magnetic head.

It is yet another advantage of the hard disk drive of the present invention that it includes a magnetic head having a media heating device that is fabricated within a perpendicular magnetic head.

It is yet a further advantage of the hard disk drive of the present invention that it includes a magnetic head having a media heating device that is fabricated within a longitudinal magnetic head.

It is still another advantage of the hard disk drive of the present invention that it includes a magnetic head having a media heating device that is easier and less expensive to fabricate in that one or both of the electrical leads are comprised of a magnetic pole of the magnetic head.

These and other features and advantages of the present invention will no doubt become apparent to those skilled in the art upon reviewing the following detailed description which makes reference to the several figures of the drawings.

IN THE DRAWINGS

The following drawings are not made to scale of an actual device, and are provided for illustration of the invention described herein.

DETAILED DESCRIPTION OF THE PREFERRED EMBODIMENTS

Figure 1:
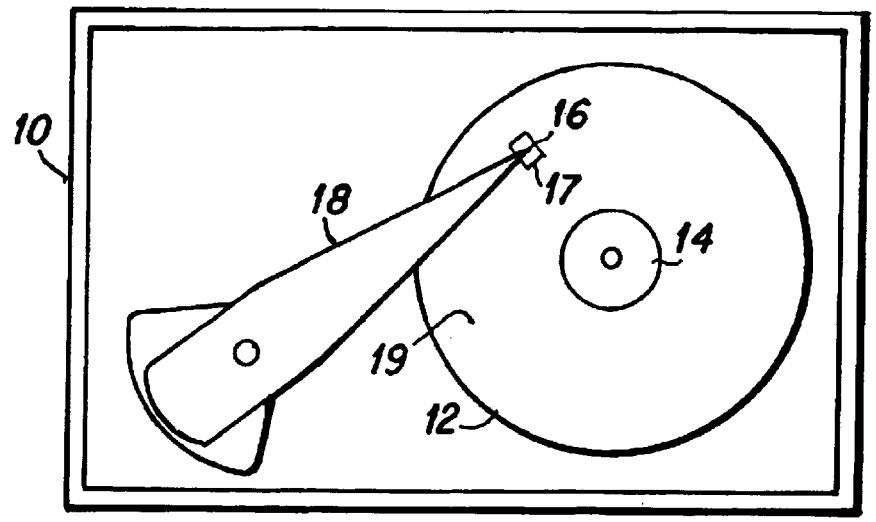
FIG. 1 is a schematic top plan view of a hard disk drive including the magnetic head of the present invention.

The magnetic head of the present invention is utilized to read and write data to magnetic media, such as a hard disk in a hard disk drive. A simplified top plan view of a hard disk drive 10 is presented in FIG. 1, wherein at least one magnetic media hard disk 12 is rotatably mounted upon a spindle 14. A magnetic head 16 of the present invention is formed upon a slider 17 that is mounted upon an actuator arm 18 to fly above the surface 19 of each rotating hard disk 12, as is well known to those skilled in the art. A typical hard disk drive 10 may include a plurality of disks 12 that are rotatably mounted upon the spindle 14, and a plurality of actuator arms 18, each having at least one slider 17 with a magnetic head 16 that is mounted upon the distal end of the actuator arms 18. As is well known to those skilled in the art, when the hard disk drive 10 is operated, the hard disk 12 rotates upon the spindle 14 and the slider acts as an air bearing in flying above the surface of the rotating disk. The slider 17 includes a substrate base upon which various layers and structures that form the magnetic head are fabricated. Such heads are fabricated in large quantities upon a wafer substrate and subsequently sliced into discrete magnetic heads 16.

Figure 2:
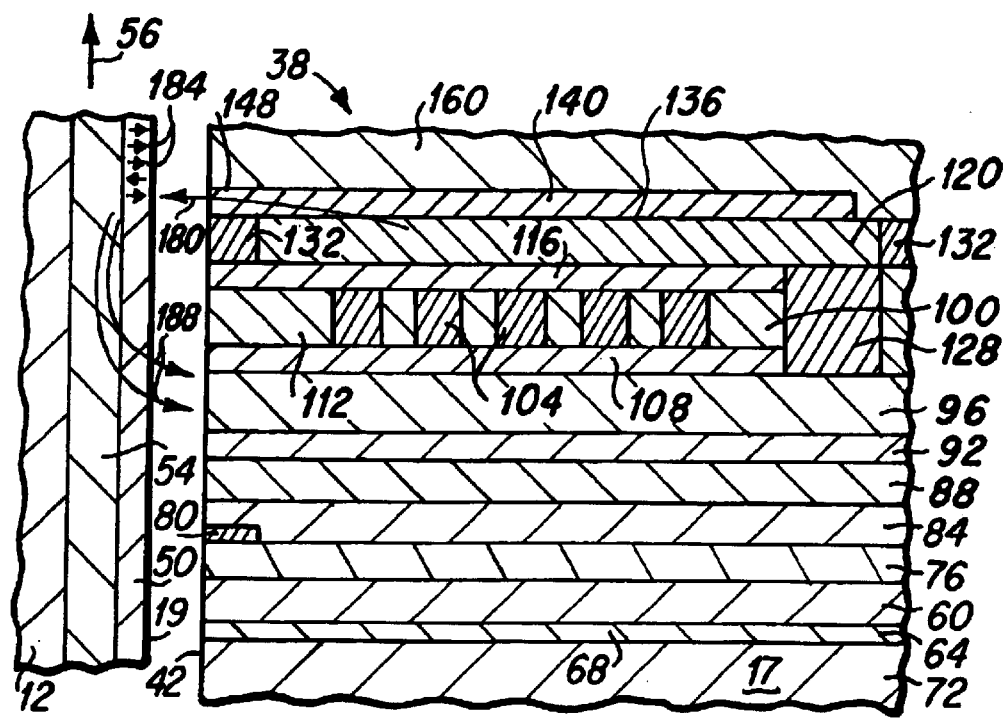
FIG. 2 is a side cross-sectional view depicting various components of a prior art perpendicular magnetic head.

FIG. 2 is a side cross-sectional diagram of a typical prior art perpendicular magnetic head 38 which serves as a basis for the description of an improved perpendicular write head of the present invention which follows. As depicted in FIG. 2, a slider 17 having an air bearing surface (ABS) 42 is shown in a data writing position above the surface 19 of a hard disk 12 The disk 12 includes a high coercivity magnetic layer 50 that is fabricated on top of a magnetically soft underlayer 54. In FIG. 2, the disk 12 is moving towards the top (arrow 56) relative to the stationary slider 17.

The perpendicular head 38 includes a first magnetic shield layer (S1) 60 that is formed upon a seed layer 64 that is deposited upon the upper surface 68 of the slider substrate 72. A first insulation layer (G1) 76 is formed on the S1 shield 60 and a read head sensor element 80 is formed on the G1 layer 76. A second insulation layer (G2) 84 is formed on the sensor 80 and a second magnetic shield layer (S2) 88 is formed upon the G2 insulation layer 84. An electrical insulation layer 92 is then deposited upon the S2 shield 88, and a first magnetic pole 96 is fabricated upon the insulation layer 92. An induction coil structure 100 is fabricated upon the P1 pole 96, that includes induction coil turns 104 that are typically formed upon an electrical insulation layer 108 and within filling insulation 112, and with a further insulation layer 116 that is formed on top of the coil turns 104. A second magnetic pole layer 120 typically termed a shaping layer or yoke 120, is fabricated on top of the induction coil structure 100. The shaping layer 120 is preferably formed of NiFe in at. % combination such as 45/55 or 80/20. A magnetic back gap piece 128 joins the back portions of the P1 pole 96 and the shaping layer 120, such that magnetic flux can flow between them. Following the fabrication of the shaping layer 120, alumina 132 is deposited across the surface of the wafer which results in filling the areas in front of the shaping layer 120 at the ABS 42. A CMP step may be next conducted to form a planar surface and expose the upper surface 136 of the shaping layer 120. A probe layer 140 including a pole tip 148 is next fabricated in magnetic flux communication with the shaping layer 120. The probe layer 140 may be fabricated utilizing photolithographic techniques and is preferably comprised of a high magnetic moment material such as a CoFe alloy.

Following the fabrication of the probe layer 140, further magnetic head fabrication steps, such as the fabrication of electrical interconnects (not shown), are accomplished, as are well known to those skilled in the art, and the magnetic head is subsequently encapsulated, such as with the deposition of an alumina layer 160. Thereafter, the wafer is sliced into rows of magnetic heads, and the ABS surface of the heads is carefully polished and lapped and the discrete magnetic heads are ultimately formed.

As is well understood by those skilled in the art, electrical current flowing through the induction coil 104 will cause magnetic flux to flow through the magnetic poles of the head, where the direction of magnetic flux flow depends upon the direction of the electrical current through the induction coil. For instance, current in one direction will cause magnetic flux 180 to flow through the shaping layer 120 through the narrow pole tip 148 into the high coercivity magnetic layer 50 of the hard disk 14. This magnetic flux 180 causes magnetized data bits 184 to be recorded in the high coercivity layer 50 where the magnetic field of the data bits is perpendicular (see arrows 184) to the surface 34 of the disk 14. The magnetic flux then passes through the high coercivity layer 50 and flows into the magnetically soft underlayer 54 and disburses towards the P1 pole 96. The magnetic flux then flows upwardly (see arrows 188) into the P1 pole 96 and then through the back gap piece 128 to the shaping layer 120, thus completing a magnetic flux circuit. In such perpendicular write heads, it is significant that at the ABS, the P1 pole 96 is much larger than the pole tip 148 such that the density of the magnetic flux passing upwardly (see arrows 188) through the high coercivity magnetic layer 50 is greatly reduced and will not magnetically affect, or flip, the magnetic field of data bits on the hard disk, such as bits on data tracks adjacent to the track being written upon. As is known to those skilled in the art, the size and shape of the induction coil 100 and the P1 pole 96 may vary in different write head designs. Also, write head designs are known in which a large magnetic pole, such as the P1 pole, can be located to follow the writing pole (that is the second magnetic pole with its pole tip) as data is written on the rotating magnetic disk. Additionally, the position of the shaping layer 120 and the probe layer 140 can be reversed, such that the probe layer is fabricated on the induction coil structure 100 and the shaping layer is fabricated upon the probe layer.

As indicated hereabove, to increase the areal data storage density of hard disk drives, the disks are fabricated with high coercivity magnetic media that can form and maintain smaller magnetic data bit cells. To write data to the high coercivity media it is helpful to include a media heating device within the magnetic head, such that the localized heating of the media reduces its coercivity and the magnetic head can then more easily and reliably write data bits into the heated magnetic media layer. Once the disk returns to ambient temperature the high coercivity of the magnetic media provides the bit latency necessary for the recorded data bit. As is described hereinbelow, the present invention describes magnetic heads having improved media heating devices.

Figure 3:
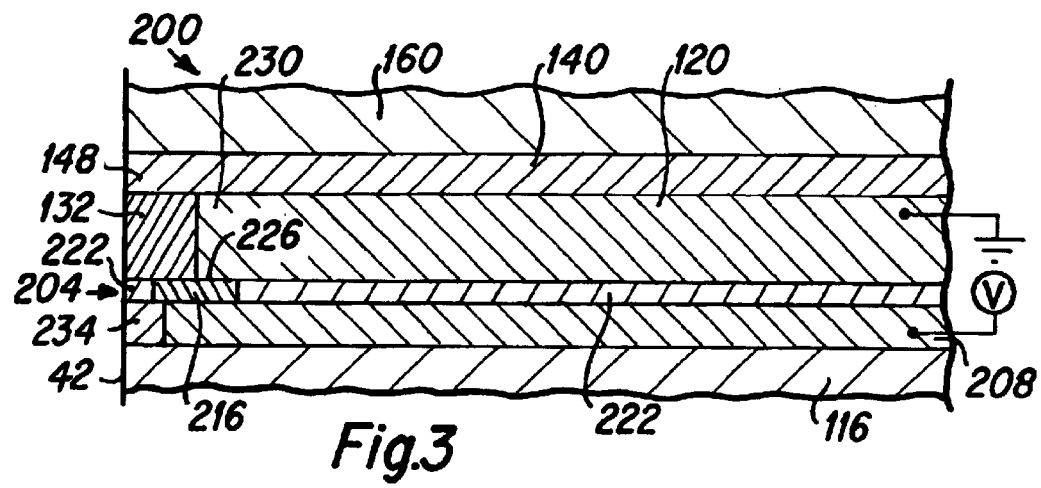
FIG. 3 is a side cross-sectional view depicting a first embodiment of a magnetic head of the present invention that includes a media heating device.

FIG. 3 is a side cross-sectional view of a portion of a first embodiment 200 of a magnetic head of the present invention that includes a media heating device 204. As depicted therein, the magnetic head embodiment 200 includes the induction coil insulation layer 116 as well as the shaping layer 120 and probe layer 140 that are similar to the structures depicted in FIG. 2 and described above, whereby they are correspondingly numbered for ease of comprehension. An additional feature of the magnetic head 200 is that a media heating device electrical lead layer 208 is fabricated upon the insulation layer 116. Thereafter, a thin film heating element 216 is fabricated upon the lead 208 proximate the ABS surface 42 of the head. A layer of electrical insulation 222 is next deposited upon the lead layer 208, and a polishing step is then undertaken to expose the top surface 226 of the heating element 216. The shaping layer 120 is subsequently fabricated upon the insulation layer 222. It is significant to note that the forward end portion 230 of the shaping layer 120 is fabricated directly onto the top surface 226 of the heating element 216.

It can therefore be seen that the heating element 216 is formed in electrical connection with both the lead layer 208 and the shaping layer 120, such that electrical current to the heating element 216 can flow from the electrical lead 208 through the heating element 216 and back through the shaping layer 120. The heating device 204 therefore includes a first electrical lead 208, the heating element 216 and the second electrical lead 120 which is also the shaping layer. Thus, in this magnetic head embodiment 200 the shaping layer 120 functions both as a magnetic flux conduit to the probe layer 140 and as an electrical current lead that conducts current to the heating element 216. This dual usage of the shaping layer 120 facilitates the fabrication of the heating device in which the complexity and expense of fabricating a second electrical lead layer to the heating element is avoided.

The heating element 216 is fabricated as a thin film element that may be generally rectangular in shape, having a length of approximately 100 nm, a width of approximately 100 nm and a thickness of approximately 50 nm to 100 nm. It is preferably formed of a material at least in part comprising $InO_x$ alloy, $RuO_x$ alloy, or $IrO_x$ alloy. Electrical current flows through the thickness of the heating element from the lower lead layer 208 through the heating element to the upper shaping layer 120, such that the current flow is generally perpendicular to the planar thin film heating element 216. It is desirable that most of the voltage drop of the heating device 204 be across the heating element 216. A desirable electrical potential across the heating element 216 is less than 2 volts where the heating element 216 has a resistivity of approximately 100 to 1,000 $\Omega$cm and the leads 208 and 120 have only a few ohms resistance from the heating element to their rear connection, such that the voltage drop of the heating device 204 will be primarily across the heating element 216. The lead 120 is preferably comprised of a material such as Cr, NiFe, or Cu and the shaping layer magnetic pole 120 is formed of a relatively thick layer of NiFe which acts as a good electrical conductor as well as a magnetic pole piece. Copper is desirable for forming the leads 208 and 120 in locations (not shown) outside of the pole regions due to its low resistivity. A process to form such a heater 216 would be to deposit the heater layer(s) full film across the wafer surface. Then by masking the desired heater dimensions, the unwanted heater material is removed by ion milling. This milling will not only remove the heater material but also remove some of the underlying lead 208. Therefore it is preferred the lead 208 is sufficiently thick so that the loss from the heater fabrication process has a minimal impact on the conductivity of the lead 208. Another feature that the lead 208 may have is a top surface which is electrically conductive and ion mill resistant. Such a layer may be 100 nm of tantalum. Other lead geometries may exist for the lead 208. However, the same processing considerations apply. Namely, the heater 216 definition process cannot significantly impact the conductivity of the lead 208.

It is desirable, though not necessary, that the heating element 216 be fabricated slightly away from the ABS 42 of the head (as is depicted in FIG. 3), to limit corrosion of the heating element and to avoid possible electrical discharge from the heating element to the media disk 14 during a writing operation. To further avoid the possibility of electrical discharge to the media, it is also desirable that the heater lead 208 not be exposed at the ABS 42, and electrical insulation 234, such as alumina, can be deposited at the ABS 42, between the lead 208 and the ABS to shield the end of the lead 208 at the ABS. Additionally, because the probe layer 140, which includes the pole tip 148, is fabricated upon the shaping layer 120, it is desirable that the shaping layer be electrically grounded in the heating device electrical circuit, such that the probe layer 140 is also grounded and any possible electrical discharge from the probe tip 148 to the media disk is avoided.

A further improvement that can be incorporated into the magnetic head embodiment 200 is that the insulation layer 132 which separates the front portion 230 of the shaping layer 120 from the ABS 42 can be composed of a more thermally conductive material, such as NiP, which then serves as a thermal conduction layer. The thermal conduction layer 132 serves to more efficiently radiate heat to the media which aids in the data bit writing process of the magnetic head. It is to be understood that the fabrication of the thermal conduction layer 132 in front of the shaping layer 120 can also be beneficially incorporated into the magnetic head embodiments that are subsequently described.

Figure 4:
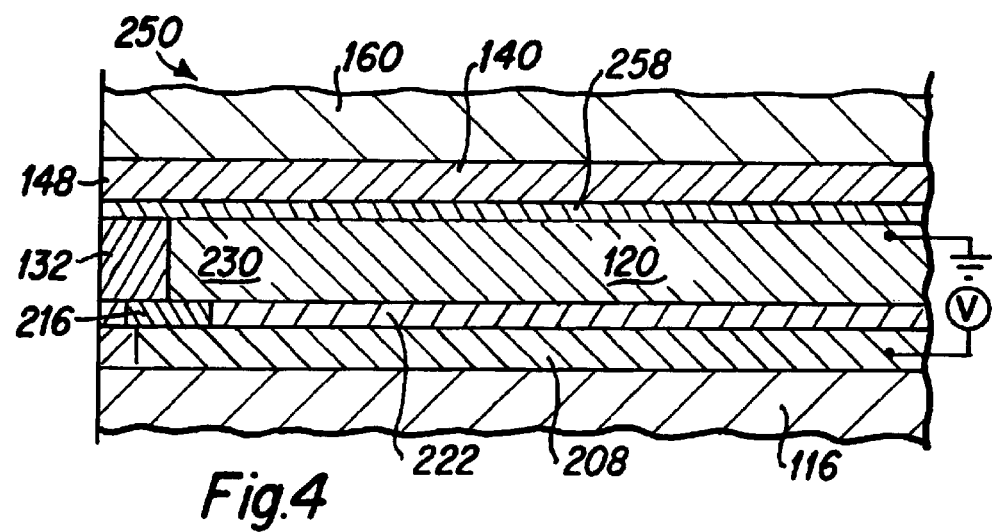
FIG. 4 is a side cross-sectional view depicting another embodiment of a magnetic head of the present invention.

FIG. 4 is a side cross-sectional view depicting an alternative magnetic head embodiment 250 of the present invention having many similar features to the magnetic head embodiment 200 depicted in FIG. 3, and such features are identically numbered for ease of comprehension. To further avoid the possibility of electrical discharge from the pole tip 148 to the media where the shaping layer 120 functions as a heating device electrical lead, a layer of electrical insulation 258 is fabricated between the shaping layer 120 and the probe layer 140. Some care must be taken in the fabrication of this insulation layer 258 in that the magnetic flux flow from the shaping layer 120 to the probe layer 140 must not be unduly restricted by creating a large reluctance gap due to the thickness of the insulation layer 258. Therefore the insulation layer 258 is preferably formed of alumina and is as thin as it can reasonably be fabricated. Where the insulation layer 258 is used to electrically isolate the probe layer 140, it is not necessary that the shaping layer 120 be grounded, as it is in the magnetic head embodiment 200 depicted in FIG. 3, because the threat of electrical shorts to the media through the pole tip 148 is minimized.

Figure 5:
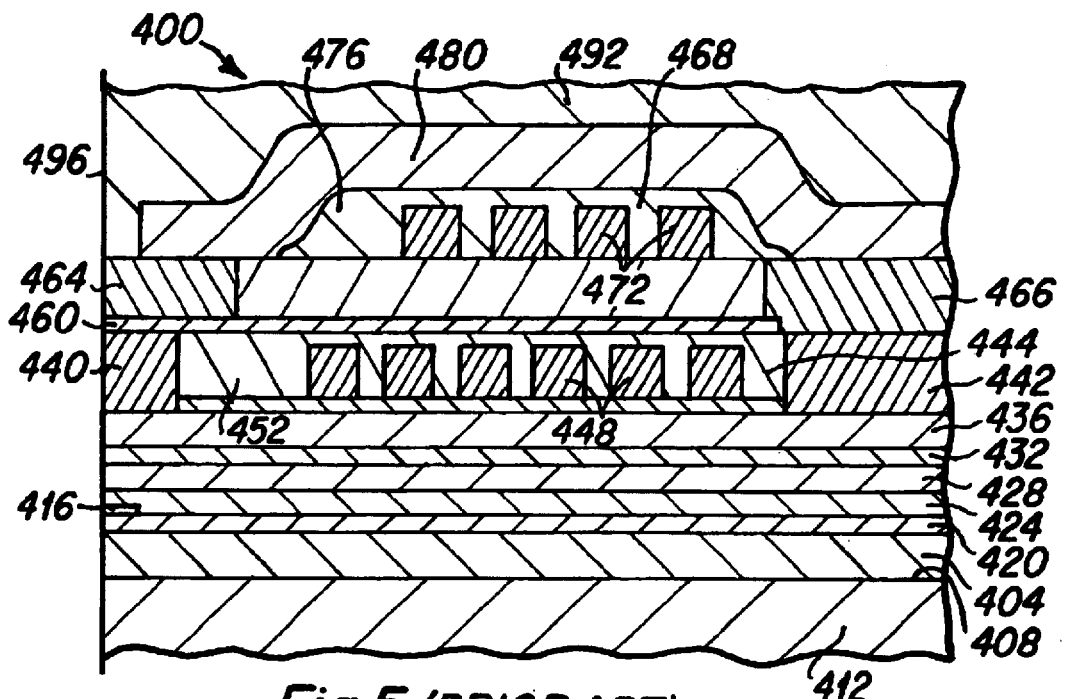
FIG. 5 is a side cross-sectional view depicting various components of a prior art longitudinal magnetic head.

FIG. 5 is a side cross sectional view depicting portions of a prior art longitudinal magnetic head 400 which serves as a basis for the description of further embodiments of the present invention. As will be understood by those skilled in the art, the magnetic head 400 includes a first magnetic shield layer (S1) 404 that is formed upon a surface 408 of a slider body material 412. A read head sensor element 416 is disposed within insulating layers 420 and 424, and a second magnetic shield layer (S2) 428 is formed upon the upper insulation layer 424. An insulation layer 432 is then deposited upon the S2 shield 428, and a first magnetic pole (P1) 436 is fabricated upon the insulation layer 432.

Following the fabrication of the P1 pole layer 436, a P1 pole pedestal 440 and a back gap piece 442 may be fabricated upon the P1 pole layer 436, and a first induction coil layer 444, including induction coil turns 448 within insulation 452, is fabricated above the P1 pole layer 436 within the layer that includes the P1 pole pedestal 440. Thereafter, a write gap layer 460 is deposited, followed by the fabrication of a P2 magnetic pole tip 464 and a second back gap piece 466. A second induction coil layer 468 may be fabricated above the layer containing the P2 pole tip 464, including induction coil turns 472 within insulation 476. A yoke portion 480 of the second magnetic pole is next fabricated in magnetic connection with the P2 pole tip 464, and through back gap elements 442 and 466 to the P1 pole layer 436. Following the fabrication of the second magnetic pole yoke 480, further magnetic head fabrication steps, such as the fabrication of electrical interconnects (not shown), are accomplished, as are well known to those skilled in the art, and the magnetic head is subsequently encapsulated, such as with the deposition of an alumina layer 492. Thereafter, the wafer is sliced into rows of magnetic heads, the ABS surface 496 of the heads is carefully polished and lapped and the discrete magnetic heads are ultimately formed. It is to be understood that this description omits many detailed fabrication steps that are well known to those skilled in the art, and which are not deemed necessary to describe herein in order to provide a full understanding of the present invention.

As has been indicated hereabove, the present invention is a magnetic head including a media heating device that provides thermal assistance in recording data bits to high coercivity magnetic media, where one or both of the magnetic poles also serve as an electrical lead of the media heating device. As will be understood from the following detailed description of this embodiment of the magnetic head of the present invention, the heating device can be disposed at different locations within the head. For ease of description, this application describes in detail a heating device that is fabricated beneath the P1 pole pedestal 440 and above the P1 pole layer 436; however it is not to be limited to that location. Also, the location and fabrication of other head elements, such as the induction coils, may be varied, and the present invention is not to be limited to the number or location of elements such as the induction coil. Additionally, as is well known to those skilled in the art, in an alternative magnetic head design the S2 shield 428 also serves as a first magnetic pole 436, in which case the insulation layer 432 is not fabricated. This alternative magnetic head design is termed a merged magnetic head, and the heating device of the present invention can be fabricated above the shield/pole 428 of a merged magnetic head in the same manner as it is fabricated in the piggyback magnetic head design that is depicted in FIG. 5 and described in detail herein. The fabrication of a media heating device within a longitudinal magnetic head of the present invention is next described.

Figure 6:
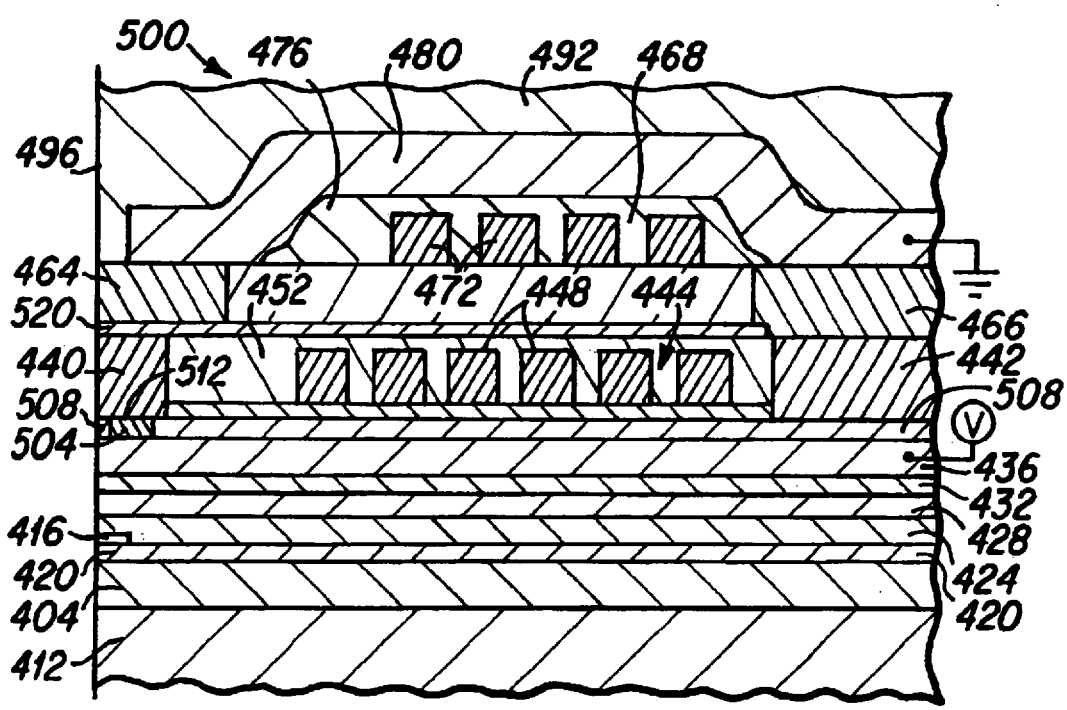
FIG. 6 is a side cross-sectional view depicting yet another embodiment of the magnetic head of the present invention that includes a media heating device.

FIG. 6 is a side cross-sectional view depicting a longitudinal magnetic head 500 of the present invention. The magnetic head 500 includes many features that are substantially identical to features in the prior art longitudinal magnetic head 400 depicted in FIG. 5, and corresponding structures are numbered identically for ease of comprehension. As depicted in FIG. 6, the magnetic head 500 of the present invention includes a first magnetic shield layer (S1) 404 that is formed upon a surface of the slider body material 412. A read head sensor element 416 is disposed within insulating layers 420 and 424, and a second magnetic shield layer (S2) 428 is formed upon the upper insulation layer 424. An insulation layer 432 is then deposited upon the S2 shield 428 and a first magnetic pole (P1) 436 is fabricated upon the insulation layer 432. Thereafter, a thin film heating element 504 is fabricated upon the P1 pole layer 436 proximate the ABS surface 496 of the head. The thin film heating element 504 may be substantially similar to the heating element 216 described above. That is, it may be generally rectangular in shape, having a length of approximately 100 nm, a width of approximately 100 nm and a thickness of approximately 50 nm to 100 nm. It is preferably formed of a material, at least in part comprising $InO_x$ alloy, $RuO_x$ alloy, or $IrO_x$ alloy.

A layer of electrical insulation 508, such as alumina, is next deposited upon the P1 pole layer 436 and the thin film heating element 504, and a polishing step is then undertaken to expose the top surface 512 of the heating element 504. A P1 pole pedestal 440 and a back gap piece 442 are then fabricated upon the insulation layer 508. It is significant to note that the P1 pole pedestal 440 is fabricated directly onto the top surface 512 of the heating element 504. It can therefore be seen that the heating element 504 is formed in electrical connection with both the P1 pole layer 436 and the P1 pole pedestal 440, such that electrical current to the heating element 504 can flow from the P1 pole layer 436 through the heating element 504 and then through the P1 pole pedestal 440, whereby the current flow is generally perpendicular to the planar thin film heating element 504. A first induction coil layer 444, including induction coil turns 448 disposed within insulation 452 is fabricated above the insulation layer 508, within the layer that includes the P1 pole pedestal 440. Thereafter, a write gap layer 520 is deposited upon the P1 pole pedestal 440 and the induction coil layer 444, followed by the fabrication of a P2 magnetic pole tip 464 of the second magnetic pole, and a second back gap piece 466 which is formed upon the first back gap piece 442.

The write gap layer 520 should be formed of an electrically conductive, non-magnetic material in order to complete the electrical circuit through the heater and pole structure. However, if a differing secondary electrical lead (not shown) is fabricated in connection to the heater, then these additional restrictions on the write gap material can be ignored. It is to be noted that the area of the back gap 442 above the insulator layer 508 introduces an additional magnetic reluctance to the write head. To reduce the effect of this magnetic reluctance, the surface area of the back gap 442 (in the plane of the wafer) should be substantially greater than the overlap of the P2 pole tip 464 above the P1 pole tip 440 with the write gap 520 in between.

A second induction coil layer 468 may be fabricated above the layer containing the P2 pole tip 464, including induction coil turns 472 within insulation 476. A yoke portion 480 (which may also be termed a shaping layer) of the second magnetic pole is next fabricated in magnetic communication with the P2 pole tip 464 and through back gap elements 466 and 442 to the P1 pole layer 436. The head is subsequently encapsulated in alumina 492, and it is finally processed in a series of well known steps such that an air bearing surface 496 is created.

In this magnetic head embodiment 500, the write gap layer 520 is ideally fabricated from a material such as tantalum, rhodium, ruthenium or palladium that is electrically conductive while being nonconductive to magnetic flux passing therethrough. It is therefore to be understood that the electrical current path of the heating device passes from the P1 pole layer 436, through the heating element 504, through the P1 pole pedestal 440, through the write gap layer 520 and through P2 pole tip 464 and through the second magnetic pole yoke 480. Thus electrical current flows through the thickness of the heating element such that the current flow path is generally perpendicular to the planar thin film heating element 504. It is desirable that most of the voltage drop of the heating device be across the heating element 504. A desirable electrical potential across the heating element 504 is less than 2 volts where the heating element 504 has a resistivity of approximately 100 to 1,000 Ωcm and the lead structures have only a few ohms resistance from the heating element to their rear connection, such that the voltage drop of the heating device will be primarily across the heating element 504.

In this magnetic head embodiment the P1 magnetic pole 436 and the second magnetic pole yoke 480 each function as both a magnetic flux conduit and as an electrical current lead that conducts current to the heating element 504. This dual usage of the magnetic poles facilitates the fabrication of the heating device in which the complexity and expense of fabricating separate electrical leads to the heating element is avoided. It is significant to note that the electrical insulation layer 508 serves to electrically isolate the P1 pole layer 430 from the first back gap piece 442, to prevent electrical shorting of the P1 pole lead 436 and P2 pole yoke lead 480 through the back gap elements 442 and 466. It is also significant to note that electrical insulation 452 is fabricated between the induction coil turns 448 and the write gap layer 520 because the write gap layer is formed of an electrically conductive material which would act as an electrical short of the induction coil turns 448 if the insulation were not present.

It is desirable, though not necessary, that the heating element 504 be fabricated slightly away from the ABS 496 of the head (as depicted in FIG. 6), to limit corrosion of the heating element and to avoid possible electrical discharge from the heating element to the media disk 14 during a writing operation. To further avoid the possibility of electrical discharge to the media, it is desirable that the second magnetic pole yoke 480 be electrically grounded in the heating device electrical circuit, such that the voltage drop of the heating device is primarily across the heating element 504. The P2 pole tip 464 and P1 pole pedestal 440 are also grounded due to their connection to the grounded second magnetic pole yoke 480 to further avoid possible electrical discharge to the media disk. There is also the consideration of electrochemical corrosion of the pole tip, which can occur if there is significant potential upon the pole while the write head is in operation. This can be minimized by either limiting the potential, altering the pole material, or introducing an alternate lead structure to maintain the pole at the near ground or floating electrical potential.

Figure 7:
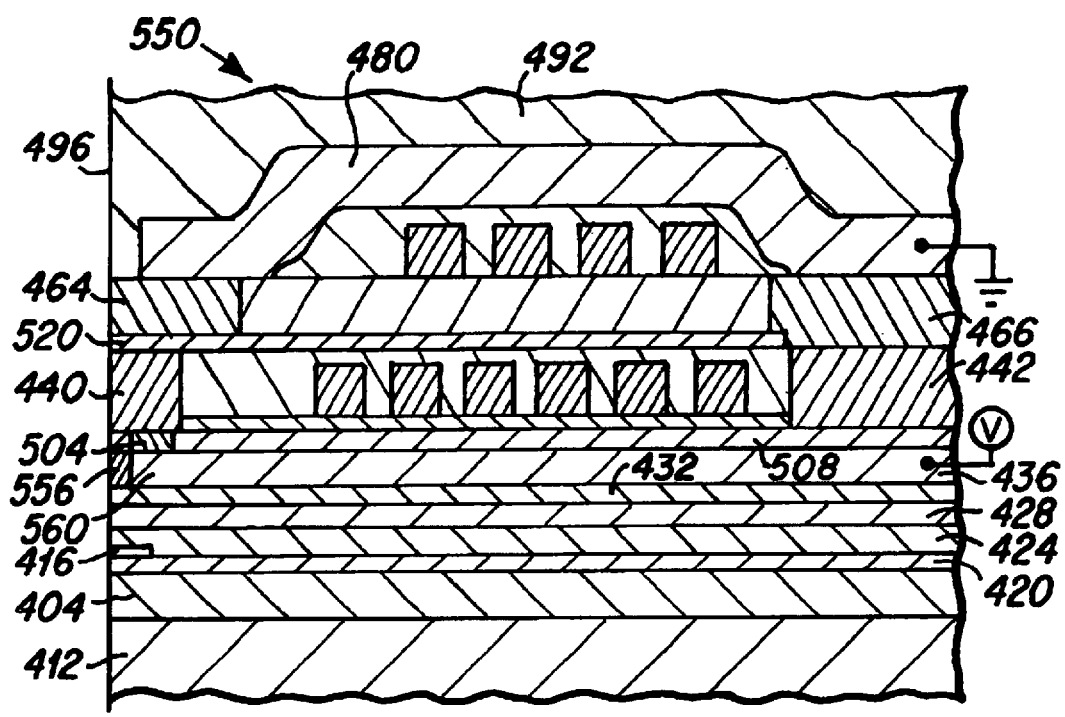
FIG. 7 is a side cross-sectional view depicting yet a further embodiment of a magnetic head of the present invention.

Another longitudinal magnetic head embodiment 550 of the present invention is depicted in a side cross-sectional view in FIG. 7. It can be seen that the magnetic head embodiment 550 depicted in FIG. 7 has many similar features to the magnetic head 500 embodiment depicted in FIG. 6, and corresponding structures are numbered identically for ease of comprehension. A significant difference between the magnetic head 550 depicted in FIG. 7 and the magnetic head 500 depicted in FIG. 6 is that the P1 magnetic pole 436 of the magnetic head depicted in FIG. 7 is recessed from the ABS 496. That is, a small quantity of electrical insulation 556, such as alumina, that is coplanar with the P1 pole 436 is deposited between the front edge 560 of the P1 pole and the ABS 496. Because the front edge 560 of the P1 pole 436 is recessed, care must be taken to ensure that there is sufficient overlap and physical contact between the heating element 504 and the P1 pole 436 to ensure good conduction of electrical current from the P1 pole 436 through the heating element 504. Additionally, there must be sufficient overlap between the P1 pole pedestal 440 and the recessed P1 pole 436 to assure good magnetic flux conduction therebetween. The insulation piece 556 serves to reduce the threat of electrical shorts to the media through the P1 pole 436 because the end surface 560 of the P1 pole 436 is no longer exposed at the ABS 496.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head, comprising:

a first magnetic pole;

a second magnetic pole;

at least one of said magnetic poles including a magnetic shaping layer;

a media heating device being disposed adjacent to and in electrical connection with said shaping layer;

said media heating device including a heating element and two electrical leads, and where at least one of said magnetic poles is utilized as a said electrical lead of said heating device.

2. A magnetic head as described in claim 1 wherein said one of said magnetic poles that includes a shaping layer also includes a probe layer, and wherein said shaping layer is utilized as a said electrical lead of said heating device.

3. A magnetic head as described in claim 2 wherein an electrical insulation layer is disposed between said shaping layer and said probe layer.

4. A magnetic head as described in claim 2 wherein another said electrical lead of said heating device is disposed beneath said shaping layer, and wherein an electrical insulation layer is disposed between said electrical lead and said shaping layer.

5. A magnetic head as described in claim 1 wherein said heating element is shaped as a planar member having a lower surface and an upper surface, and wherein electrical current flows through said heating element in a direction that is generally perpendicular to said lower surface and said upper surface.

6. A magnetic head as described in claim 1 wherein said first magnetic pole and said second magnetic pole are utilized as said electrical leads on opposite sides of said heating device.

7. A magnetic head as described in claim 6 wherein said magnetic head includes a first magnetic pole pedestal and said second magnetic pole includes a P2 pole tip and said shaping layer, and wherein electrical current for said heating device flows through said first magnetic pole and through said first magnetic pole pedestal and through said P2 pole tip and through said shaping layer.

8. A magnetic head as described in claim 7 wherein said magnetic head further includes a write gap layer that is disposed between said P1 pole pedestal and said P2 pole tip, and is comprised of a non-magnetic, electrically conductive material.

9. A hard disk drive, comprising:
- at least one hard disk being fabricated for rotary motion upon a disk drive;
- at least one magnetic head adapted to fly over said hard disk for writing data on said hard disk, said magnetic head including:
- a first magnetic pole tip;
- a second magnetic pole;
- at least one of said magnetic poles including a magnetic shaping layer;
- a media heating device being disposed adjacent to and in contact with at least one said shaping layer;
- said media heating device including a heating element and two electrical leads, and where at least one of said magnetic poles is utilized as a said electrical lead of said heating device.

10. A hard disk drive as described in claim 9 wherein said one of said magnetic poles that includes a shaping layer also includes a probe layer, and wherein said shaping layer is utilized as a said electrical lead of said heating device.

11. A hard disk drive as described in claim 9 wherein an electrical insulation layer is disposed between said shaping layer and said probe layer.

12. A hard disk drive as described in claim 10 wherein another said electrical lead of said heating device is disposed beneath said shaping layer, and wherein an electrical insulation layer is disposed between said electrical lead and said shaping layer.

13. A hard disk drive as described in claim 9 wherein said heating element is shaped as a planar member having a lower surface and an upper surface, and wherein electrical current flows through said heating element in a direction that is generally perpendicular to said lower surface and said upper surface.

14. A hard disk drive as described in claim 9 wherein said first magnetic pole and said second magnetic pole are utilized as said electrical leads on opposite sides of said heating device.

15. A hard disk drive as described in claim 14 wherein said magnetic head includes a first magnetic pole pedestal and said second magnetic pole includes a P2 pole tip and said shaping layer, and wherein electrical current for said heating device flows through said first magnetic pole and through said first magnetic pole pedestal and through said P2 pole tip and through said shaping layer.

16. A hard disk drive as described in claim 15 wherein said magnetic head further includes a write gap layer that is disposed between said P1 pole pedestal and said P2 pole tip, and is comprised of an electrically conductive material.

* * * * *